United States Patent
Kaga et al.

(10) Patent No.: US 6,909,197 B2
(45) Date of Patent: Jun. 21, 2005

(54) CEMENT DISTRIBUTING VEHICLE

(75) Inventors: Kikuo Kaga, Kanagawa (JP); Haruo Kaga, Kanagawa (JP); Kenji Umeda, Kanagawa (JP); Takeyoshi Hirai, Kanagawa (JP); Shunsaku Wakabayashi, Kanagawa (JP)

(73) Assignee: Mitomo Corporation, Kanagawa (JP)

( * ) Notice: Subject to any disclaimer, the term of this patent is extended or adjusted under 35 U.S.C. 154(b) by 120 days.

(21) Appl. No.: 10/658,366

(22) Filed: Sep. 10, 2003

(65) Prior Publication Data

US 2004/0261892 A1 Dec. 30, 2004

(30) Foreign Application Priority Data

Jun. 11, 2003 (JP) .................................... 2003-166107

(51) Int. Cl.[7] .............................................. B60K 6/00
(52) U.S. Cl. .......................... 290/40 C; 290/45; 123/3; 180/65.2
(58) Field of Search ................................ 290/1 R, 1 A, 290/40 C, 45; 322/14; 180/65.2; 123/2, 3

(56) References Cited

U.S. PATENT DOCUMENTS

| | | | | |
|---|---|---|---|---|
| 3,789,281 A | * | 1/1974 | Shibata ..................... 318/696 |
| 4,024,926 A | * | 5/1977 | Butoi ........................ 180/65.3 |
| 4,651,066 A | * | 3/1987 | Gritter et al. ................ 318/139 |
| 4,923,025 A | * | 5/1990 | Ellers ........................ 180/65.2 |
| 5,214,358 A | * | 5/1993 | Marshall ..................... 318/139 |
| 5,667,029 A | * | 9/1997 | Urban et al. ................ 180/65.2 |
| 6,326,702 B1 | * | 12/2001 | Yonekura et al. ......... 290/40 C |

* cited by examiner

Primary Examiner—Nicholas Ponomarenko
(74) Attorney, Agent, or Firm—Wenderoth, Lind & Ponack, L.L.P.

(57) ABSTRACT

The invention seeks to provide a cement distributing vehicle, which permits greatly reducing labor, time and cost require for packed cement distribution, permits manufacturing a compact vehicle without sacrifice in the great tank capacity, and permits efficient distribution even to bad distribution condition destinations. In a cement distributing vehicle 1 which comprises a powdery cement accommodating tank 2, an automatic packing machine 3 for packing a predetermined quantity of powdery cement from the power cement accommodating tank, and a flywheel PTO shaft for taking out the engine torque to the outside, and in which the vehicle personnel packs and distributes a required quantity of cement by using the automatic packing means according to an order of a person desiring purchase of packed cement, a generator is connected to the flywheel PTO shaft for power supply from it to vehicle-mounted component devices such as the automatic packing machine.

3 Claims, 2 Drawing Sheets

CEMENT DISTRIBUTING VEHICLE

BACKGROUND OF THE INVENTION

1. Field of the Invention

This invention relates to a cement distributing vehicle, which permits greatly simplifying packed cement distribution systems for prompt and smooth distribution of high quality packed cement.

2. Prior Art

Heretofore, as the form of cement distribution in the market, there have been a method, in which powdery cement is transported in a state of accommodation in a cement accommodation tank mounted in a cement transport vehicle to big quantity requesters, and a method, in which packed cement is transported on a truck to pretty quantity requesters such as construction material shows and retail sales shops.

In the prior art packed cement distribution system, powdery cement is transported from a cement manufacturing plant to a packing plant (or a packing department in the manufacturing plant), and packed cement obtained therein is transported by a large-scale 10 tons truck or the like to a large service center controlling an area. From this service center (and sometimes via a small-scale service center) packed cement is distributed by a small truck or the like construction material shops or like small shops and pretty quantity requesters whenever an order is received. In the case of a distribution of the packed cement to a construction site, a distributing vehicle equipped with a tank for the packed cement is used. (e.g. see Japanese Patent publication No. 244521/1996).

The packed cement is formed by taking the relative humidity resistance and the handling property of powdery cement. However, even the packed cement may be deteriorated in quality by absorbing moisture in long stock time. Therefore, in construction material shops or like small shops, it is not suited to stock large quantity of cement. Besides, for stocking large quantity of cement, it is necessary prepare place and expensive warehouse. Therefore, it has been inevitable to make frequent pretty quantity orders. Furthermore, in the above prior art packed cement distribution system the management of packed cement in the service center requires great cost and man-hours inclusive of a vast place, and also pretty quantity distribution from the service center to purchasers requires great time and man-hours. Therefore, it has been difficult to cope with packed cement sales price reduction as demanded by the market. The inventor of the present application accordingly derived a cement distributing vehicle, in which an automatic packing machine for packing a predetermined quantity of powdery cement from a powdery cement accommodation tank is mounted on a transporting vehicle with a cement accommodation tank mounted thereon.

The cement distribution accommodating vehicle requires a power source for the automatic packing machine, a dust collector and a controller for controlling these components in addition to an air compressor for forcedly transporting powdery cement in the cement tank. As such power source, a vehicle-mounted battery is insufficient in capacity. For this reason, an engine-driven power generator which is driven with gasoline or the like is mounted in the vehicle to generate necessary AC power. However, such power generator is heavy in weight and large in size, and thus requires a wide space for its mounting in the vehicle. This means that in case of mounting a tank with a capacity of accommodating 10 tons of powdery cement, it is inevitable that the total vehicle length exceeds 10 meters. Such excessive total vehicle length leads to the possibility that it is difficult to drive the vehicle to the distribution destination or park the vehicle therein. To cope with such difficulty, it is a measure to repeat the round trip for the distribution by reducing the tank capacity. From the standpoint of the distribution efficiency, it is conversely desired to increase the tank capacity, and to this end it is necessary to provide a compact vehicle with as great tank capacity as possible.

SUMMARY OF THE INVENTION

The invention has an object of providing a cement distributing vehicle, which permits greatly reducing labor, time and cost necessary for packed cement distribution, and also permits manufacturing a compact vehicle without sacrifice in the tank capacity so that it can distribute the cement with satisfactory distribution efficiency even in the case of bad distribution conditions.

DETAILED DESCRIPTION OF THE PREFERRED EMBODIMENTS

Figure 1:
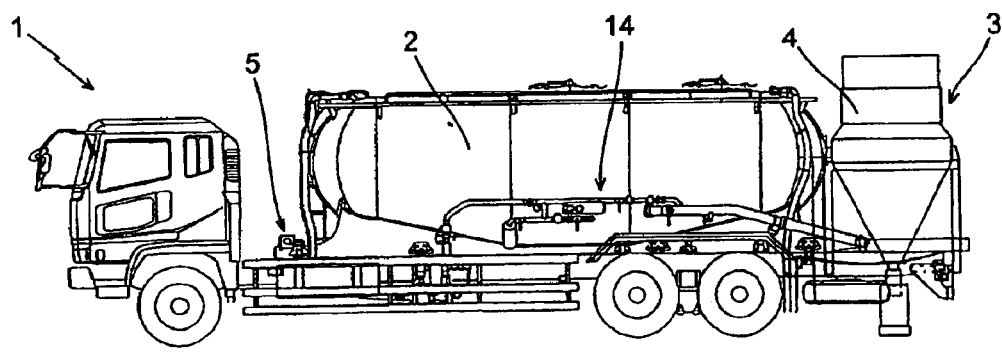
FIG. 1 is a view showing a cement distribution vehicle according to the invention.

FIG. 1 shows a cement distributing vehicle according to the invention. This cement distributing vehicle 1 is a trailer, on which a powdery cement accommodation tank 2 having a capacity of accommodating about 10 tons of powdery cement, an automatic packing machine 3 including a hopper-like silo 4 with a capacity of about one ton for packing the powdery cement, and a power generator connector 5, which is coupled to a flywheel PTO (power take-off shaft) preliminarily provided as engine torque take-out means on the vehicle for distributing power to various devices mounted on the vehicle.

In details, the automatic packing machine 3 in the cement accommodating vehicle 1 includes, in addition to the silo 4 noted above, an automatic bag feeding machine (not shown) for taking bags (of inner valve type) for packing powdery cement therein one by one and opening the taken-out bags and an automatic fixed quantity charging machine (not shown) for measuring powdery cement and charging the measured powdery cement into each of these bags. The inner valve type bag has a valve body functioning as an inner lid, which is provided in an upper open portion of the bag. By charging powdery cement into the bag by inserting a nozzle into the open portion of the bag and then turning down the bag, the charged powdery cement pushes the valve body to seal the opening. That is, no step of sealing the opening is needed. For space saving, bags may be manually set without provision of any automatic gas feeding machine.

The silo 4 has a sensor for detecting the quantity of the accommodated cement for permitting automatic forced transporting of powdery cement from the powdery cement when the cement quantity in the silo 4 is reduced and also permitting manual forced transporting of powdery cement from the powder cement accommodation tank 2 to the silo 4. Although not particularly shown, such components as a compressor for the forced compression of powder cement in the powder cement accommodation tank 2, a dust collector for collecting cement powder flying in the silo 4, an operation board for carrying out the packing operation, a weight for weighing an interval valve type bag placed thereon, a control unit for automatically controlling the quantity of powdery cement from the silo 4 according to the measurement of the weight (i.e., the weight of the packed cement) and a dust collector disposed in the neighborhood of a nozzle, from which powdery cement is discharged into the internal valve type bag, for withdrawing powdery cement flying up to the outside of the bag.

Figure 2:
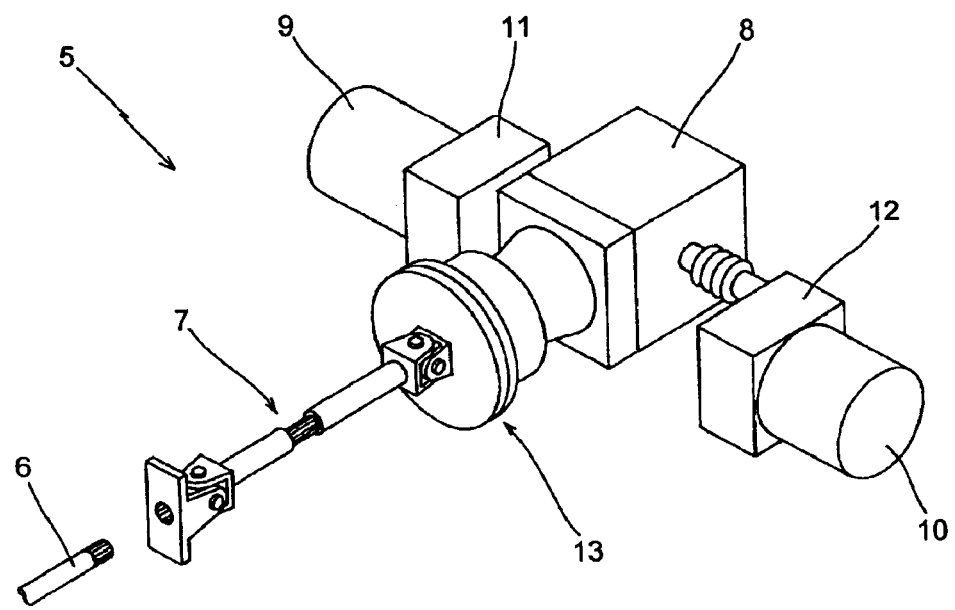
FIG. 2 is a view for describing a power generator connector used for the cement distributing vehicle according to the invention.

As a power source for supplying power to the component devices mounted on the vehicle, a power generator connector 5 as shown in FIG. 2 is mounted on the cement distributing vehicle 1. The power generator connector 5 has a drive shaft 7, which is coupled to the flywheel PTO shaft 6 preliminarily provided in the vehicle for take out the engine torque to the outside of the engine, for directly transmitting the rotational motion. A gear box 8 is coupled to the drive shaft 7 such as to orthogonally convert the direction of the rotational motion and distributing the torque to two shafts. A first power generator 9 (5 kVA) for generating AC 200 V power mainly for motor driving is coupled to one of the shaft of the gear box 8. A second power generator 10 (3 kVA) for generating AC 100 V mainly for controllers for controlling the motor and also other electric devices, is coupled to the other shaft of the gearbox 8. Comparing these power generators with the engine drive type power generator, in the case of an engine drive type power generator of 600 kg, the torque-drive generators according to the invention can be made to be very compact with a weight of 186 kg with substantially the same or generation capacity. As a means for forcedly transporting powdery cement in the powdery cement accommodation tank 2, a compressor may be disposed on a side PTO shaft (separate from the above flywheel PTO shaft and not shown), which is preliminarily provided in the vehicle.

In order to increase the rotational number of the flywheel PTO shaft 6 for ensuring stable power generator operation, a first and a second speed gear unit 11 and 12 are disposed between the gear box 8 and the first and second power generators 9 and 10 to increase the rotational number of the flywheel PTO shaft 6 to about three times suitable for the power generators. Further, the flywheel PTO shaft 6 is always rotating when the vehicle engine is in operation, a separable electromagnetic clutch 13 is disposed between the drive shaft 7 and the gear box 8 so that the torque is transmitted when and only when the generators are driven and is not transmitted to the gear box 8 when it is not necessary to transmit any torque.

The cement distributing vehicle 1 does not only feed out powdery cement in the cement accommodation tank 2 into the silo 4, but it also has a switching means 14 for feeding out powdery cement via a hose to the outside. In other words, the cement distributing vehicle 1 according to the invention is not only used for packing powdery cement, but it is also utilized for delivering powdery cement without packing. Furthermore, it is made possible to cleanly discharge powdery cement residual in the cement accommodation tank 2 after the end of operation and load new powdery cement before the next delivery.

Figure 3:
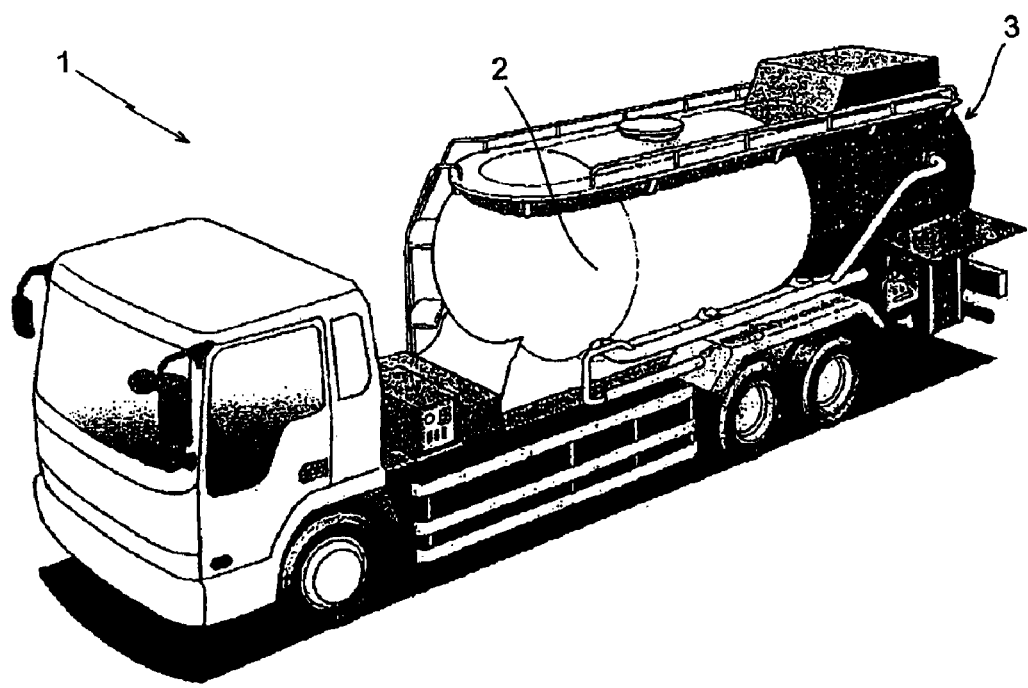
FIG. 3 is a view outlining the cement distributing vehicle according to the invention.

FIG. 3 shows an example of a cement distributing vehicle 1 described in the foregoing. The personnel in the distributing vehicle 1 accommodates powdery cement in the cement accommodation tank 2 in a cement plant or a service center according to instructions from the managing headquarter for managing the cement distribution, and also drives the vehicle by receiving instructions from the managing headquarter for distributing packed cement to construction material shops or like small shops as packed cement purchasers.

At the site of an instructed packed cement purchaser the personnel in the vehicle packs the necessary quantity of cement by operating the automatic packing machine 3 of the cement distributing vehicle 1, and delivers the packed cement to the purchaser. In the case of a cement distributing vehicle having an area for accommodating packed cement, packing of powdery cement using the automatic packing machine may be made before arrival at the distribution destination.

While the above embodiment has been described in connection with the case delivering powdery cement as packed cement, but not only packed cement but also non-packed powdery cement, if necessary, may be delivered by weighing.

As has been described in the foregoing, with the cement distributing vehicle according to the invention it is possible to simplify the packed cement distribution system to reduce labor in the factory packing, eliminate wasteful packed cement stock in the stage of distribution, greatly reduce the labor, time and cost necessary for the distribution, and efficiently and smoothly distributing desired quantities of high quality cement. Furthermore, by using compact torque-driven power generator in lieu of the conventional large-size engine-driven power generator, it is possible to manufacture compact vehicles without sacrifice in the great tank capacity and distribute cement with high distribution efficiency even to bad distribution condition destinations.

Furthermore, by distributing the output torque of the engine torque take-out means for driving the first power generator generating AC 200 V power to drive motors of various components and a second power generator generating AC 100 V power mainly for the controller for controlling the motors, it is possible to supply power to both the power source for motor driving and the power source for the controller with a simple arrangement.

Moreover, with the separable clutch means provided between the engine torque take-out means and the power generations for driving the power generators with the output torque from the engine torque take-out means when and only when using the power generators, it is possible to transmit rotation to the gear box when and only when driving the power generators and transmit no rotation when it is unnecessary. It is thus possible to efficiently drive the generators without any excessive load born by the engine.

What is claimed is:

1. A cement distributing vehicle comprising:
   a powdery cement accommodation tank;
   an automatic packing means for packing a predetermined quantity of powdery cement in the powdery cement tank;
   at least one power generator coupled to the vehicle engine for supplying power to vehicle-mounted component devices including the automatic packing means for packing the predetermined quantity of powdery cement; and
   a torque take-out means for connecting the least one power generator to the vehicle engine.

2. The cement distributing vehicle according to claim 1, wherein the at least one power generator includes a means for distributing the torque output of the torque take-out means, a first power generator for generating AC 200 V power mainly for driving motors of various component devices, and a second power generator for generating AC 100 V power for a controller for controlling the motors.

3. The cement distributing vehicle according to claim 1, which further comprises a separable clutch means disposed between the engine torque take-out means and the at least one power generator for driving the at least one power generator with the torque output of the engine torque take-out means when and only when the at least one power generator is used.

* * * * *